United States Patent [19]
Dyke et al.

[11] Patent Number: 6,148,006
[45] Date of Patent: *Nov. 14, 2000

[54] COMMUNICATION SYSTEM ARCHITECTURE, EXCHANGE HAVING A PLURALITY OF BROADBAND MODEMS AND METHOD OF SUPPORTING BROADBAND OPERATION ON A ONE TO ONE BASIS

[75] Inventors: Peter John Dyke, Saffron Walden; Michael Phillip Dyer, Stansted, both of United Kingdom

[73] Assignee: Nortel Networks Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/968,332
[22] Filed: Nov. 12, 1997
[51] Int. Cl.$^7$ ...................................................... H04J 1/00
[52] U.S. Cl. ............................................ 370/480; 375/260
[58] Field of Search ................................... 370/480, 484, 370/486, 487; 375/222, 260

[56] References Cited

U.S. PATENT DOCUMENTS

| | | | |
|---|---|---|---|
| 5,668,857 | 9/1997 | McHale . | |
| 5,768,279 | 6/1998 | Barn et al. ............................... | 370/486 |
| 5,910,970 | 6/1999 | Lu ........................................... | 375/222 |

FOREIGN PATENT DOCUMENTS

| | | |
|---|---|---|
| 2 215 943 | 9/1989 | United Kingdom . |

OTHER PUBLICATIONS

VII International Workshop on Optical Access Networks Conference Proceedings, Sep. 24–27, 1995, Nuremberg, "Deployment Options for Broadband Networks,"—Jeff Stern, et al.

VII International Workshop on Optical Access Networks Conference Proceedings, Sep. 24–27, 1995, Nuremberg, "Broadband Access Systems: A Comparison of FDM Hybrid/Fiber Coax and TDM Digital Broadband,"—P. Harten, et al.

VII International Workshop on Optical Access Networks Conference Proceedings, Sep. 24–27, 1995, Nuremberg, "A Broadband Multiservice Access System,"—J. L. Joubert, et al.

*Primary Examiner*—Joseph L. Felber
*Attorney, Agent, or Firm*—Lee, Mann, Smith, McWilliams, Sweeney & Ohlson

[57] ABSTRACT

To reduce the complexity, size and power dissipation associated with the deployment of xDSL-type modems in distribution points (140–142) of a telecommunications network, a transparent concentrating optical transmission scheme is interposed between an exchange (100) and a subscriber terminal (210). Specifically, xDSL-type modems (102–104 and 220–224) are employed both within the exchange (100) and, nominally each subscriber terminal (210) of the telecommunication system, while an optical fiber supports the transmission of frequency division multiplexed broadband signals sent between the exchange (100) and the distribution points (140–142). Twisted-pairs then couple respective broadband signals received and demultiplexed at the distribution points (140–142) to appropriately addressed subscriber terminals (210), while upstream transmissions are subjected to a complementary process from the xDSL modems (220–224) in the subscriber terminals (210) to the xDSL modems (220–224) in the exchange (100).

19 Claims, 2 Drawing Sheets

COMMUNICATION SYSTEM ARCHITECTURE, EXCHANGE HAVING A PLURALITY OF BROADBAND MODEMS AND METHOD OF SUPPORTING BROADBAND OPERATION ON A ONE TO ONE BASIS

BACKGROUND OF THE INVENTION

This invention relates, in general, to the architecture of a communication system, and is particularly, but not exclusively, applicable to an arrangement of modems in a broadband access exchange of a telephone network, such as a public switched telephone network (PSTN).

SUMMARY OF THE PRIOR ART

Telecommunication systems that interconnect subscriber terminals are now capable of supporting broadband data communication on both an inter-subscriber terminal basis (through an exchange) or on a client-server to subscriber terminal basis. In either case, both the subscriber terminal and the infrastructure equipment contain a dedicated modem, which modems are coupled together to support two-way communication between the subscriber terminal and the exchange. In this respect, there is a one-to-one mapping between modems associated with each subscriber terminal and the infrastructure. For example, current broadband access systems that interconnect subscriber terminals and an exchange use copper cabling (usually termed "twisted pair" technology), and conventionally employ two broadband modems, one at each end of the twisted pair. More particularly, spare spectrum (i.e. a spare frequency channel) on, for example, a twisted-pair communication resource is isolated from conventional audio or basic rate integrated service digital network (ISDN) signals using a suitable filter. Broadband transmissions are then typically supported over the communication resource by xDSL-based signalling protocols, such as Asynchronous Digital Subscriber Line (ADSL) and Very high-speed Digital Subscriber Line (VDSL) Such broadband schemes can support data rates in excess of 2 Megabits per second (Mbps), although this rate can be significantly increased by using more complex and elaborate transmission protocols and by reducing transmission distances. Moreover, xDSL protocols are sufficiently robust to support symmetrical data rate transmissions while providing immunity to cross-talk, noise and general radio frequency interference (RFI), with xDSL protocols using modulation schemes such as Quadrature Phase Shift Keying (QPSK), Carrierless Amplitude-Phase (CAP) modulation, Quadrature Amplitude (QAM) modulation and Discrete Multi-Tone (DMT modulation).

As will be appreciated, the subscriber terminals may be wire-line telephones that have semi-permanent communication resources assigned between each subscriber terminal and the infrastructure, i.e. the exchange, or may have a dynamically assignable communication resource supported, for example, on a radio frequency (RF) link established between a base station sub-system (BSS) of a cellular communication system and the subscriber terminal.

Unfortunately, a significant infrastructure cost relates to the requirement to provide a plethora of modems (provided within line cards) to support the many subscriber terminals that operate within a broadband communication system. As such, it is desirable that the number of modems implemented within a system is minimised.

With respect to the structure of conventional telephony networks and particularly in relation to local telephone exchanges, a saving in each cost-per-customer connection is accomplished by reducing the number of switch-ports needed to service a given number of subscriber terminals. This concentration function is achieved by recognising that, although each subscriber terminal requires a connection to a central switch, the actual connection is discontinuous and bursty and therefore only carries traffic, i.e. information, for relatively short periods of time. As such, for a sufficiently large number of users, the number of switch-ports needed in the exchange is small in proportion to the number of subscriber terminals connected thereto.

For example, if a subscriber terminal, such as a telephone or a computer, utilises a communication resource (i.e. a connection) for only 10% of a peak operating period for the network, a group of subscriber terminals require, on average, only one-tenth of the number of switch connections to support all the calls. In this type of system, network operators accept that, occasionally, a subscriber terminal wishing to make a call may not be able to access the switch because all other switch-ports are contemporaneously occupied by other subscriber terminals. However, appropriate dimensioning of the communication system will ensure that a redundancy is built into the communication system, and that switch-port contention (unavailability) only therefore happens very infrequently.

As will be appreciated, the principle of determining an appropriate number of communication resources for the network is based on classic communication theory and is expressed statistically in Erlangs, and it will further be appreciated that optimisation of the system will depend upon the type of traffic supported during each call, i.e. the requirements for video communication systems will differ from those for speech communication.

Like conventional telephony systems, broadband networks achieve a concentration function using an analogous principle. Specifically, while each broadband subscriber is allocated a dedicated modem at both the exchange and at its premises, infrastructure equipment located deeper within the broadband network is shared and therefore dimensioned to provide sufficient capacity to service an expected number of simultaneously active broadband calls. The broadband network cannot therefore provide simultaneous service to all broadband subscriber terminals, and yet broadband modems remain dedicated to a particular subscriber terminal regardless of its usage of the broadband service(s).

As previously stated, the provision of such dedicated modems on a per-line basis is expensive, and is further exaggerated by the increased complexity required in broadband networks. Consequently, there is a significant increase in cost associated with providing a broadband network, which cost is over and above that for a corresponding narrowband telephony system and which therefore discourages wider deployment of broadband systems.

More particularly, a modem is comprised from three functional blocks, with its cost of manufacture heavily dependent upon the processing requirements of the modem. More explicitly, a modem includes line interfaces, digital-to-analog (D/A) and analog-to-digital (A/D) converters and a signal processor. The line interfaces provide signals of a suitable amplitude to drive communication signals along the twisted pairs (or the equivalent transmission medium), and also to accept incoming signals. The D/A converter acts to provide an interface between the digital processing functions and the analog signals used on the twisted pairs, and the signal processor provides and implements complex processing logic required to characterise the line and optimise the capacity. It is the complexity of the processor that contributes significantly to the cost of each modem, with this complexity increasing as a function of the number of services (and the information bearing capabilities of each service) supported in the broadband network. Indeed, in relation to broadband communication, generally, types of transmission technology range from simple coding schemes (that are suitable for short distances) to elaborate and complex signalling schemes that achieve greater distance penetration over a communication resource, such as a twisted pair. These more elaborate and complex signalling schemes therefore necessarily require greater processing capabilities and consequently impose additional costs, although very large scale integration can be employed to mitigate against these effects and allow some sharing of common functionality, e.g. xDSL functions can be shared at the distribution point. Additionally, as processing power increases, power consumption by the DSP also rises to a level of, typically, 2–3 watts per line card device and hence to an appreciable extent whereby thermal problems become a significant issue.

Another technical hurdle that needs to be overcome to allow deployment of a successful broadband network is associated with the location of broadband modems in street cabinets or curb-side units, generically referred to as "distribution points" because these points can be tapped to provide point-to-multipoint connectivity. Specifically, in order to utilise existing twisted pairs for xDSL-based signalling protocols, existing wire-line communication circuitry is modified by co-locating broadband circuitry with the distribution points and a broadband server with the exchange. The broadband server is typically coupled to the broadband circuitry by an optical fibre, and the broadband circuitry then converts broadband optical communication into xDSL for application to the twisted-pairs. Again, a one-to-one relationship presently exists between broadband modems located in the broadband circuitry and corresponding broadband modems associated with the subscriber terminals.

Unfortunately, the successful use of xDSL is distance limited by cross-talk (i.e. interference) and attenuation by the twisted-pairs, while the cost effectiveness of providing broadband services to subscribers is also exacerbated by the fact that subscribers are geographically distributed. Therefore, if broadband services are to be provided to isolated subscribers, the cost of the broadband infrastructure could require an unacceptably high tariff charge to be levied against a subscriber to the service. A conflict therefore exists inasmuch as the broadband circuitry must be located sufficiently close to the subscriber (typically within about 1 kilometer) for robust communication, while the broadband circuitry must also be distantly located from the subscribers (and hence nearer to the exchange) to reduce the significant costs associated with deploying broadband modems (notwithstanding that component costs otherwise increase as a result of having to satisfy higher technical specifications that support longer distance xDSL transmissions). In fact, the deployment of such broadband circuitry is expensive not only in terms of fiscal consideration but also in relation to the relatively large size, power consumption and heat dissipation of the associated broadband circuitry. Indeed, in the latter respect, the location in an outside environment of broadband circuitry is far from ideal because of the requirement to provide a constant and non-fluctuating power supply and service for such fibre-to-the cabinet or curb-side solutions.

As such, requirement exists to provide an improved communication infrastructure and access network that supports broadband-type communications but which utilises a reduced number of broadband modems in a more efficient and cost-effective manner, and which ideally does not need to change or modify existing fixed (i.e. the twisted-pair) connections.

SUMMARY OF THE INVENTION

According to a first aspect of the present invention there is provided a communication system comprising an exchange having a plurality of broadband modems; a distribution point coupled to the exchange over a communication resource that carries encoded broadband data; and a plurality of subscriber terminals coupled to the distribution point, at least some of the plurality of subscriber terminals containing a broadband modem arranged, on an individual basis, to communicate encoded broadband data with a selected broadband modem in the exchange via the distribution point and over the communication resource.

In another aspect of the present invention there is provided a method of transferring encoded broadband data between an exchange having a plurality of broadband modems and a subscriber terminal containing a broadband modem arranged to communicate encoded broadband data with a selected one of the plurality of broadband modems in the exchange, the encoded broadband data communicated between the exchange and the subscriber terminal via a distribution point that is coupled to the exchange via an optical fibre and which is coupled to the subscriber terminal via a copper-drop, the method comprising the steps of: modulating onto the optical fibre encoded broadband data addressed to the subscriber terminal at the exchange; decoding the encoded broadband data addressed to the subscriber terminal at the subscriber terminal; modulating onto the optical fibre encoded broadband data addressed to the exchange at the subscriber terminal; and decoding the encoded broadband data addressed to the exchange at the exchange.

In a preferred embodiment, the method further comprises the step of selectively routing the broadband data calls to a plurality of intermediate distribution points each coupled to the exchange through an optical fibre and each coupled to a plurality of subscriber terminals via individual copper drops.

The present invention therefore advantageously provides a communication system in which a transparent broadband connection exists between an exchange and at least one distribution point. The present invention also provides a significant increase in system flexibility (when it comes to broadband deployment), while also reducing costs associated with providing intermediate broadband modems at infrastructure distribution points. More especially, the present invention advantageously provides a communication system in which there is an improved ratio (achieved through a concentration function) between dedicated subscriber-orientated modems and assignable broadband modems located in an exchange.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
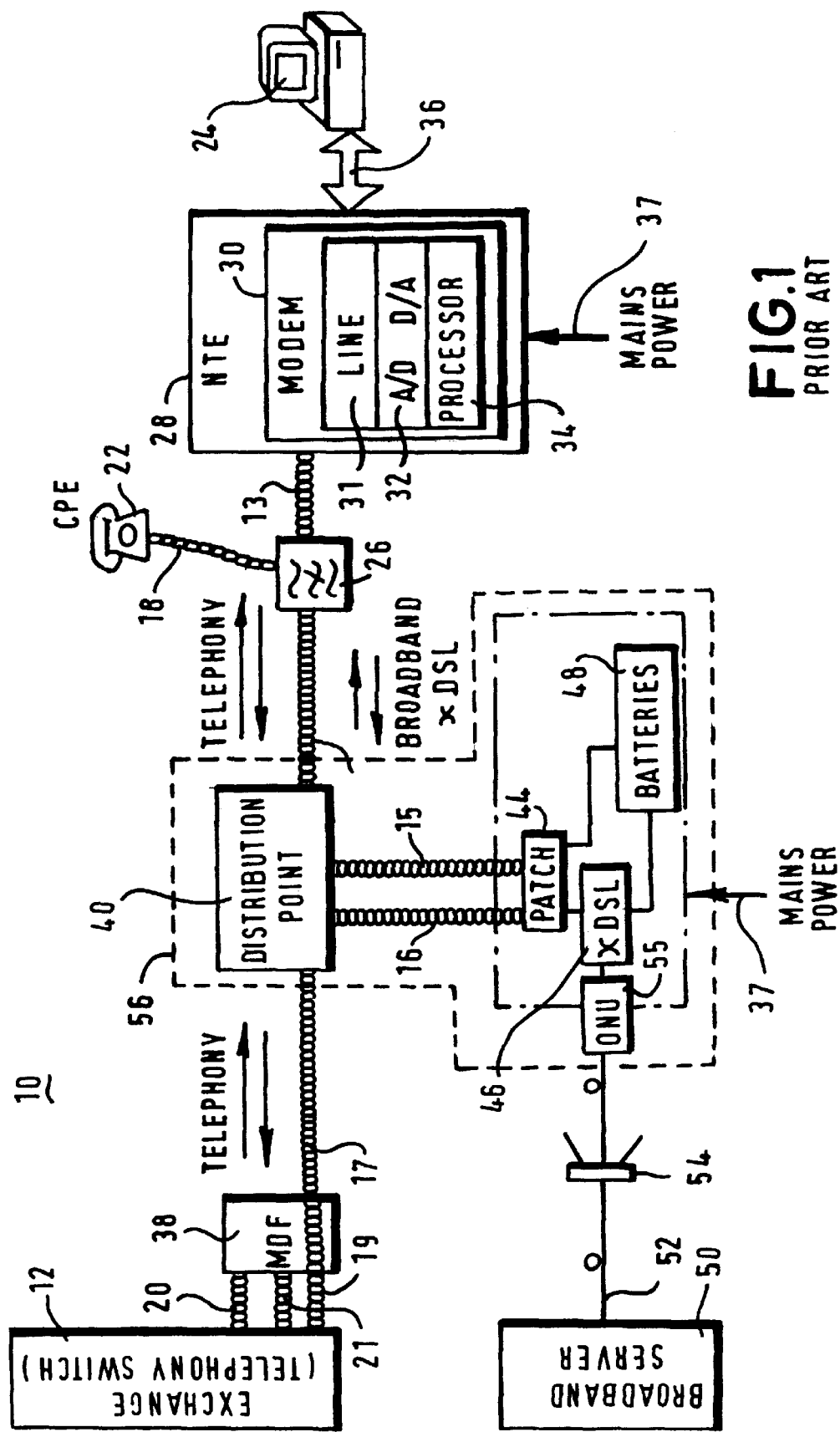
FIG. 1 is a block diagram of a prior art, wire-line communication network having broadband capabilities.

Before discussing a preferred embodiment of the present invention in detail, a comprehensive discussion of a prior art, wire-line communication network 10 (of FIG. 1) will be presented. The wire-line communication network 10 comprises an exchange (or telephony switch) 12 that is coupled, via twisted pairs 13–21, to a plurality of subscriber terminals 22–24, such as telephones and computers (generically termed "customer premises equipment", CPE). More particularly, the customer premises equipment will be coupled to the twisted pairs through a filter 26 that provides frequency separation and isolation of, for example, voice and data communications.

In relation to a telephone 22, a twisted pair 18 directly couples the telephone 22 to an adjacently positioned filter 26, whereas a computer 24 (television, internet terminal or the like) is coupled to the adjacently positioned filter 26 via appropriate network terminating equipment (NTE) 28. Typically, each NTE 28 comprises a modem 30, and a mains power supply 37 or an internal battery (not shown). The modem is comprised of three main functions, namely a line driver circuit 31, A/D and D/A converters 32 and a processor 34 that controls coding and decoding functions and processes information flow between the exchange 12 and the computer 24, or the like. The computer 24 may be coupled to the NTE 28 via a multi-line bus 36 such as an Ethernet card or RS-232 connection, or through a single serial data line or coax. The NTE receives power from a mains supply 37 or an internal battery (not shown).

In relation to the exchange 12, a main distribution frame (MDF) 38 provides a connection interface for a plurality of twisted pair connections 19–21 to the exchange 12 (only three of which connections are shown for the sake of clarity). More particularly, as will be appreciated, the purpose of the MDF 38 is to provide an array of connections at a convenient point within the infrastructure and thus to allow cross-patching of one input to any output and vice versa. Moreover, as will be understood, the cross-patching is achieved using a hard interconnect (at a cabling level) and is therefore not subject to any form of dynamic routing.

To facilitate efficient communication routing, a distribution point 40 is positioned between the exchange 12 and the filter 26. Additionally, the distribution point 40 serves as a cross-connection point for coupling broadband circuitry 42. The conventional wire-line system is thereby extended to support overlaid broadband communication through xDSL signalling protocols. The broadband circuitry contains a patch unit and filter 44 that is arranged to intercept a transmission path in the twisted-pairs, and which thus allows broadband signals to be multiplexed over the original narrowband voice signals (on isolated, high frequency channels). The patch unit and filter 44 is coupled to an xDSL modem 46, as will be understood. Power may be provided to the broadband circuitry by either internal batteries 48 or a mains (power) supply 37. The xDSL modem 46 is coupled to a broadband server 50 via an optical fibre 52 which may include a passive optical network (PON) 54 that acts to split or combine optical paths. In this way, the PON 54 can provide a concentration function in the optical channel by providing a one-to-many distribution (or vice versa). In other words, use of the PON 54 allows exchange equipment to be shared across and serve more than one distribution point (e.g. a cabinet) by using a common optical fibre to a splitter. Additionally, use of the PON 54 minimises bandwidth requirements of the system by restricting bandwidth capacity through the PON 54. However, this concentration function nonetheless still requires a dedicated xDSL modem to be assigned at the distribution point (e.g. the cabinet) to each and every subscriber terminal.

As will be understood, the broadband circuitry also includes an optical network adapter unit (ONU) 55 that essentially provides the fibre-copper interfacing through the provision of an optical transceiver and line driver configuration. The ONU 55 is located intermediate between the xDSL modem 46 and the PON 54.

Usually, the distribution point 40 and the broadband circuitry 42 will be co-located in the same street cabinet or curb-side unit, as indicated by the dotted box 56.

The structure of FIG. 1 therefore provides a fibre-to-the cabinet approach where broadband signals are first relayed to the distribution point 40 over an optical fibre and then overlaid onto twisted-pairs (occasionally referred to as copper "drops") using xDSL techniques. The structure provides a connection from an exchange to a subscriber on a point-to-multipoint basis in which signals are distributed in an 'active star' form, where individual star drops connect transmission to individual subscribers. Nevertheless, each digital subscriber terminal of FIG. 1 is allocated an individual modem within the broadband circuitry 42 on a permanent basis.

Figure 2:
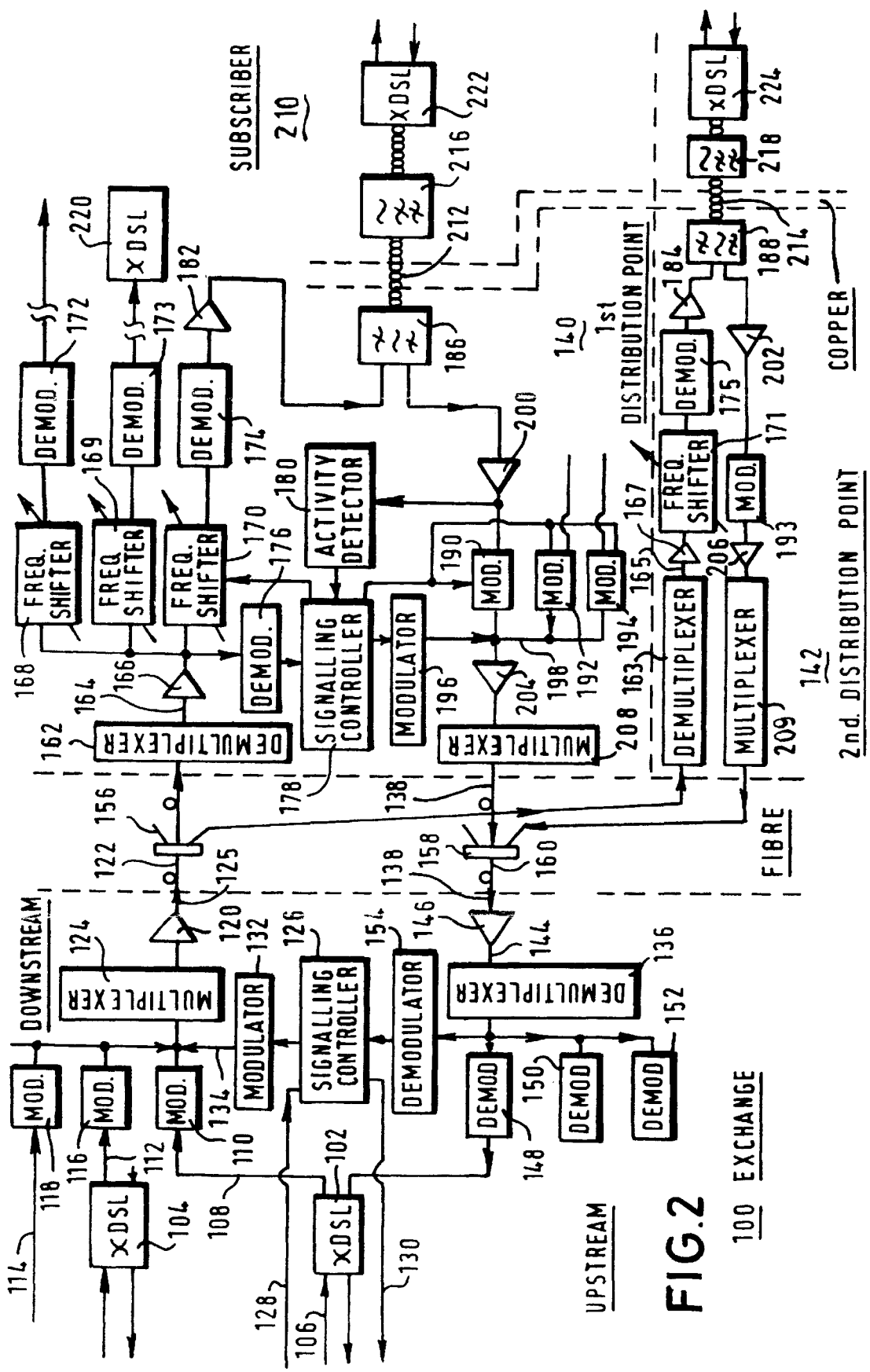
FIG. 2 shows a block diagram of a communication system according to a preferred embodiment of the present invention.

Referring now to FIG. 2, there is shown a block diagram of a communication system in accordance with a preferred embodiment of the present invention. In FIG. 2, equipment common with the prior art shares a common numbering scheme.

Considering first the structure of the exchange 100 of the preferred embodiment of the present invention, the exchange 100 contains a plurality of xDSL modems 102–104 to support VDSL protocols, for example. For the sake of clarity, only two of such xDSL modems are shown. Looking specifically at the interconnection of xDSL modem 102 (which is identical to that of xDSL modem 104), a downstream path from xDSL modem 102 begins with broadband signals on interface 106 being applied to an input of xDSL modem 102. Following signal protocol modulation in xDSL modem 102, a coded broadband signal 108 is modulated onto a carrier frequency by carrier frequency modulator 110. Similarly, coded broadband signals 112–114 from other xDSL modems (e.g. xDSL modem 104) are also modulated onto appropriate carrier frequencies by corresponding carrier frequency modulators 116–118 After modulation onto a carrier, the coded broadband signals from the respective carrier frequency modulators are multiplexed onto an optical fibre 122 by multiplexer 124 to produce a multiplexed broadband signal 125 before being amplified in amplifier array 120.

The line code used for the VDSL modem of the preferred embodiment of the present invention is DMT, although this could be substituted by QPSK, CAP, QAM, or a digital baseband line code, such as HDB3.

The exchange 100 further includes a signalling controller 126 that administers the control of suitably processed signalling information 128–130 across the communication network. As will be understood, the signalling information 128–130 (amongst other things) synchronises and frames broadband communication, and administers the set-up and tear-down of calls. Indeed, the signalling controller may be arranged to generate, administer and detect the presence of a pilot tone. Clearly, as again will readily be appreciated, signalling information will be modulated onto a dedicated carrier frequency in modulator 132 before being subjected to an amplification processes in amplifier array 120. The signalling controller is responsive to an exchange processor and system controller (not shown). Finally, carrier-modulated signalling information 134 is also multiplexed onto the optical fibre 122 by multiplexer 124.

As will be appreciated, modulation of the broadband signals onto carrier frequencies may use any one of a number of conventional techniques, such as amplitude modulation. Each separate carrier is then multiplexed onto a frequency division multiplexed (FDM) spectrum before being applied to a laser (of an ONU or the like) for transmission over the optical fibre 122.

In an upstream portion of the exchange 100, a demultiplexer 136 receives multiplexed broadband signal 138 transmitted from at least one distribution point. In FIG. 2, a first distribution point 140 and a second distribution point 142 are illustrated, although it will be understood that the exchange could be responsive to many distribution points. A more detailed description of the interconnection, function and structure of distribution points will follow later.

Typically, the broadband signals 138 will have been amplified in amplifier array 146 before separation of individual broadband channel components 144 occurs in the clemultiplexer 136. The individual broadband channel components are then individually coupled to carrier demodulator circuits 148–152. Following carrier demodulation, individual broadband channel components are coupled to respective inputs of associated xDSL modems, e.g. xDSL modem 102. Similarly, signalling information 130 is demodulated from a dedicated carrier frequency in demodulator 154 before being applied to signalling controller 126 and eventually to the exchange processor and system controller (not shown).

Each xDSL modem in the exchange is therefore allotted a dedicated carrier for both the upstream and downstream connections. Furthermore, since the optical fibre interconnect provides a communication resource between the exchange and the distribution point, the arrangement of the present invention provides a transparent transport mechanism that is supported by the preferred embodiment of the present invention in an analog scheme.

Returning to the downstream path (or chain), following multiplexing, the multiplexed broadband signal 125 (having a bandwidth of, perhaps, five hundred MegaHertz (MHz) or greater) is transmitted over the optical fibre 122. Clearly, electrical signals have necessarily been converted into optical signals by a suitably located ONU. An optional passive optical network (PON) 156 may be interspersed within the optical fibre 122 used in the downstream. The PON 156 acts to apportion certain transmission bands of the multiplexed broadband signal 125 to different distribution points, e.g. first distribution point 140 and second distribution point 142. The PON 156 therefore increases a ratio between subscriber xDSL modems and exchange-based xDSL modems, and therefore improves the cost-effectiveness of broadband deployment. As will be understood, the distribution points represent fibre-to-the-cabinet (FTT-cabinet) or fibre-to-the-curb infrastructure solutions, with the difference between the FTT-cabinet and the FTT-curb unit being merely in the numbers of subscribers served by the respective units. However, the general structure of the FTT-cabinet and FTT-curb unit is substantially identical. In a similar but complementary manner, a second PON 158 may be interspersed within an optical fibre 160 used in the upstream, with connections made to the second PON 158 by a plurality of (but at least one) distribution point(s) 140–142.

For the sake of brevity, the structure of the first distribution point 140 only will now be described in detail, although it will be obvious that connections to the PON 156 and the second PON 158 follow the same structural arrangements.

The multiplexed broadband signal 125 is coupled to a demultiplexer 162–163 in the distribution point (e.g. the first distribution point 140) to separate out individual broadband channel components 164–165. It is acknowledged that the individual broadband channel components should, in this context, be considered to include standard encoded voice data at relatively low frequency and bandwidth, since the broadband signals are overlaid above the standard encoded voice data. Amplification of the individual broadband channel components 164–165 then takes place in an amplifier array 166–167. Following amplification, individual broadband channel components 164–165 are applied on a unique basis to respectively assigned frequency shifters 168–171 that generate intermediate frequencies suitable for demodulation in associated demodulators 172–175. Signalling information that is contained in the multiplexed broadband signal 125 is extracted via a demodulator 176, and then applied to a second signalling controller 178. The function of the second signalling controller mirrors the operation of the signalling controller 126 in the exchange 100, except that: i) the second signalling controller is both coupled and operationally responsive to (in an up-link scenario) a signal activity detector 180 arranged to detect the presence of a transmission signal or request therefor; and ii) the signalling controller is also coupled to control the operation of the frequency shifters 168–171 and carrier modulator circuits 190–194.

The carrier modulator circuits 190–194 may be located in a solitary distribution point to support the transmission of single multicarrier signals (such as DMT) or to provide distinct carrier frequencies for separate and distinct subscriber terminals. Again, signalling information provided from the signalling controller 178 will be modulated onto a dedicated carrier frequency by modulator 196.

Returning to the downstream, following carrier demodulation, individual broadband channel components are again amplified (in amplifier arrays 182–184) before being applied to isolation filters 186–188, typically a passband filter for isolation of each individual broadband channel components from the narrowband voice signals, RFI, cross-talk and the like.

In an upstream path of the distribution point 140, xDSL signals emanating from subscriber terminals and output from filters 186–188, for example, are amplified in an amplifier 200 before being applied to an appropriately assigned modulator, e.g. modulator 190. An output from the amplifier is also tapped and applied to the activity detector 180 for use in determining the presence of a signal for transmission. Following modulation of the broadband signal onto a carrier, amplification of the individual broadband signals occurs in amplifier array 204–206, and then frequency division multiplexing of the individual broadband signals occurs in a second multiplexer 208–209. Subsequent to the multiplexing operation, transmission of the FDM signal over an optical fibre is achieved through the use of a laser and suitable optical network unit, as will be understood.

The distribution points 140–142, as will be understood, are coupled in a conventional fashion to subscriber terminals 210 (such as CPEs or NTEs) via twisted-pairs 212–214 More particularly, the subscriber terminals 210 also contain filters 216–218 that are principally arranged to separate broadband and narrowband channels that are received by or are transmitted from the subscriber terminal 210. Then, for receipt and transmission of broadband signals, the subscriber terminal 210 also includes a suitable xDSL modem 220–224, which xDSL modem is coupled to the subscriber terminal's filter 216–218.

The operation of the circuit of FIG. 2 will now be described. In the downstream, i.e. for communications emanating from the exchange 100, broadband data is output from the xDSL modem 102 and modulated onto a suitable carrier frequency. The broadband data may take any desired bandwidth, but typically has a bandwidth of about 2 MHz to 8 MHz. Following modulation onto a suitable carrier frequency (which can range from hundreds of MHz to tens and possibly hundreds of gigaHertz (GHz)), multiplexing of each individual broadband channel produces a composite envelope bandwidth spanning many hundreds of MHz or several GHz. The composite envelope bandwidth will also include a multiplexed signalling channel, typically located at relatively low frequency, while the pilot tone will typically be located at a relatively high and isolated frequency. The composite envelope is converted into a suitable optical signal for transmission down the fibre 122 and then converted back, prior to demultiplexing, into corresponding electrical impulses. Following demultiplexing, individual (baseband) broadband channels are obtained from outputs of the demodulators, while the filters in the subscriber terminal 210 separate the xDSL broadband signals from the narrowband voice (or Integrated Service Digital Network, ISDN) signals. The pilot tone is recovered by the signalling controller 178 for training and synchronisation purposes, e.g. in relation to frequency and timing alignment.

The system of the present invention therefore provides xDSL signalling to each copper drop as if the xDSL signalling had been introduced at the distribution points 140–142, rather than at the exchange. In this respect, the optical transmission system is transparently interposed between the xDSL modems associated with the exchange and subscriber terminals, which optical system includes analog ports.

In précis, downstream signals are transmitted over the fibre 122 (and via a splitter, e.g. PON) so that all distribution points (sometimes referred to as "out-stations") 140–142 receive the same FDM signal. Then, only the distribution points designated to use a particular channel (and therefore a particular xDSL modem) can tune, demultiplex and decode the broadband signals before the separate broadband channels are applied to appropriately addressed subscriber terminals over dedicated twisted-pairs.

For the upstream, a similar frequency division multiplexed scheme is used to transmit signals over the optical fibre 138. Also, in a preferred embodiment, the FDM carriers are arranged at a channel spacing on 8 MHz (which can conveniently carry a VDSL signal having a power spectral density of similar bandwidth), but other channel spacings can clearly be used to optimise particular system configurations. More particularly, an upstream signal (or transmission) from a twisted-pair is allocated an upstream carrier associated with the xDSL modem (in the exchange) that is assigned to the corresponding downstream communication. Separate (electrical) upstream transmissions from distinct subscriber terminals are then converted into optical signals prior to frequency division multiplexing and transmission. The exchange, upon receipt of FDM spectrum, demultiplexes the spectrum and converts the individual optical channels into electrical signals for application to the appropriate (assigned) xDSL modem for decoding.

Two-way transmission is therefore achievable by the preferred embodiment of the present invention, with the two-way transmission set-up and controlled through a distinct signalling channel and signalling control sub-system (albeit that the signalling channel is supported on the common optical fibre). Clearly, the signalling control sub-system ensures that carriers are correctly assigned to the required customer addresses and connections, and that there is no carrier collision with respect to uni-directional transmissions, as will be appreciated and readily understood.

In the preferred embodiment of the present invention, use of the concentration function provided by the PONs 156–158 also provides for a reduction in xDSL modems situated within the exchange 100 and hence a cost saving associated with system deployment. More specifically, the PONs 156–158 allow xDSL modems 102–104 at the exchange 100 to be shared across a number of subscriber terminals on a service-as-required basis.

Clearly, the modulators and demodulators described in the preferred embodiment of the present invention may be implemented in a number of different technologies, e.g. through conventional radio techniques (such as with synthesisers), or with intermediate frequency techniques (such as with standing acoustic wave filters). Also, although the preferred embodiment generally considers the use of amplitude modulation, other forms of modulation are clearly applicable, e.g. pulse modulation, frequency modulation or variants thereof. The present invention also allows Fabry-Perot lasers to be employed (rather than more highly specified laser types) as the performance of the optical link will still be superior to that of prior art twisted-pair arrangements. Additionally, the present invention can support the use of digital optical transmission rather than analog optical transmissions, but this requires a higher bit rate fibre transmission system.

Also, while the control system of the preferred embodiment of the present invention has been described in relation to separate carriers, the skilled addressee will gather that the system may also be implemented using time division multiplexing (TDM) and time division multiple access for the uplink.

The present invention has identified that a more effective and efficient system configuration can be achieved by partitioning some of the modem functionality across the communication system, generally. More particularly, while the prior art locates the xDSL modem in an adjunct to the distribution point 40 (of FIG. 1), the present invention moves some of the modem functionality back into the infrastructure and specifically into the broadband server 50 (that may be located with the exchange 12 of FIG. 1). Additionally, by removing xDSL functionality into the exchange location, an optical fibre located between the broadband server and the distribution point now appears transparent to communications because a common signalling protocol is now supported from the subscriber terminal to the exchange (with no intermediate signalling translation now required). Furthermore, the present invention greatly simplifies the composition of infrastructure in the distribution point and therefore reduces both the overall size of the distribution point and thermal management considerations in the distribution point. Consequently, the distribution point becomes more reliable. Moreover, the use of a common broadband communication resource between the exchange and the generic distribution point allows flexibility in distribution point deployment, while improving service connection availability to subscribers (through the star distribution function provided by each distribution point). Also, the present invention leaves unchanged the existing twisted pair connections to the subscriber terminals, with this encouraging the implementation of broadband services of a wider scale. An additional benefit results from the location of xDSL modems in the exchange because common information processing (through the sharing and integration of modem functions) will reduce infrastructure costs.

The present invention achieves an increased economy in relation to developing and deploying, for example, a broadband network; with a cost saving derived from the distribution of modem functionality between the exchange and distribution point. In other words, the present invention has eliminated the requirement for a dedicated line-card function per customer. The present invention therefore addresses the problems associated with power principally dissipated from the DSPs of the xDSL modems, and hence alleviates the thermal management problems associated with deployment of racks of modems in distribution points. Indeed, the present invention allows cabinet and curb-side units to be reduced in size to an extent whereby the cabinet and curb-side unit can utilise a power budget comparable to that of mobile radio handsets. Additionally, the present invention provides a concentration function achieved by the location and use of a passive optical network between the broadband server and the broadband circuitry, while also providing a mechanism for line sparing over the twisted-pairs, i.e. subscriber terminals have access to communication resources on a trunked basis whereby a subscriber terminal is not tied to a dedicated, physical link and must necessarily complete for system access (principally in an upstream scenario). Hence, in a cost effective manner, the present invention provides the functionality of existing distribution points along with both the performance capabilities of xDSL technology and an improved level of system reliability.

The present invention also lends itself to deployment within existing narrowband systems because the control system used in the narrowband system can be extended to control the broadband overlaid functions. Additionally, in the event that the existing narrowband system already contains a PON, the broadband overlay could utilise wave division multiplexing (WDM) techniques in a second optical window, e.g. 1550 nanometers. Finally, in relation to the establishment of new broadband connections between the exchange and a subscriber terminal, the requisite xDSL training sequence for each new customer drop can be permanently stored (and retrieved from memory for installation purposes) in the exchange, while self-diagnostics software can also be stored at a central repository of the exchange.

It will, of course, be understood that the above description has been given by way of example only and that modifications of detail may be made within the scope of the present invention. For example, as will be appreciated, the exchange 12 may be a PSTN or a BSS and merely provides an interface between a subscriber terminal world and an infrastructure world. Furthermore, channel assignment in the upstream and the downstream does not need to be contiguous, i.e. wave division multiplexing techniques can be used to separate channels. Furthermore, while the system has generally been described with reference to a wireline system, it will be appreciated that the present invention can be extended to benefit radio-based and coax-based systems, for example.

While the control system of the preferred embodiment of the present invention is perceived to require separate carriers, it will clearly be appreciated that control channel signalling, for example, could be implemented on a time division multiplexed basis.

What we claim is:

1. A communication system comprising:
an exchange having a plurality of broadband modems;
a distribution point coupled to the exchange over an optical communication resource that carries encoded broadband data; and
a plurality of subscriber terminals coupled to the distribution point via individual copper drops, at least some of the plurality of subscriber terminals containing a broadband modem arranged, on an individual basis, to communicate, over respective broadband channels, bi-directional encoded broadband data with a selected broadband modem in the exchange via the distribution point and over a combination of the optical communication resource and the copper drops.

2. The communication system of claim 1, wherein the encoded broadband data overlays a narrowband channel.

3. The communication system of claim 2, wherein the narrowband channel supports one of an ISDN service and a voice communication.

4. The communication system of claim 1, wherein the distribution point further comprises an optical network adapter unit that essentially provides interfacing between the optical communication resource and the individual copper drops.

5. The communication system of claim 4, wherein the optical network adapter unit contains an optical transceiver and line driver configuration.

6. The communication system of claim 1, wherein the exchange includes a plurality of modulators each coupled, on a unique basis, to each of the plurality of broadband modems.

7. The communication system of claim 6, wherein the exchange further includes a multiplexer, coupled to the plurality of modulators, for multiplexing broadband data from the plurality of modulators onto the optical fibre, and wherein the distribution point includes a demultiplexer coupled to the optical fibre and arranged to demultiplex the broadband data.

8. The communication system of claim 6, further including a plurality of distribution points each coupled to the exchange through an optical fibre and each coupled to subscriber terminals via a twisted copper-pair, the optical fibre further comprising a passive optical network arranged selectively to route broadband data to different ones of the plurality of distribution points.

9. The communication system of claim 8, wherein the plurality of distribution points includes at least one of a fibre-to-the-cabinet communication unit and a fibre-to-the-curb communication unit.

10. The communication system of claim 1, wherein the encoded broadband data is coded using an xDSL protocol.

11. The communication system of claim 10, wherein the xDSL protocol is one of ADSL, HDSL and VDSL.

12. The communication system of claim 1, wherein encoded broadband data is provided by a digital optical transmission scheme.

13. A method of transferring encoded broadband data between an exchange having a plurality of broadband modems and a subscriber terminal containing a broadband modem arranged to communicate, over respective broadband channels, bi-directional encoded broadband data with a selected one of the plurality of broadband modems in the exchange, the encoded broadband data communicated between the exchange and the subscriber terminal via a distribution point that is coupled to the exchange via an optical fibre and which is coupled to the subscriber terminal via a copper-drop, the method comprising the steps of:

modulating onto the optical fibre encoded broadband data addressed to the subscriber terminal at the exchange;

decoding the encoded broadband data addressed to the subscriber terminal at the subscriber terminal;

modulating onto the optical fibre encoded broadband data addressed to the exchange at the subscriber terminal; and decoding the encoded broadband data addressed to the exchange at the exchange, thereby to provide a one-to-one mapping of broadband modems between the exchange and the subscriber terminal.

14. The method of claim 13, wherein the encoded broadband data is encoded using an xDSL communication protocol.

15. The method of claim 14, wherein the xDSL protocol is one of ADSL, HDSL and VDSL.

16. The method of claim 15, further including the step of overlaying the encoded broadband data over a narrowband channel.

17. The method of claim 16, wherein the narrowband channel is one of an ISDN service and a voice channel.

18. The method of claim 16, further including the step of multiplexing a plurality of broadband data calls onto the optical fibre.

19. The method of claim 18, further comprising the step of selectively routing the broadband data calls to a plurality of intermediate distribution points, the intermediate distribution points each coupled to the exchange through an optical fibre and each of the plurality of intermediate distribution points coupled to a plurality of subscriber terminals via individual copper drops.

* * * * *